United States Patent
Reid

(10) Patent No.: US 6,926,826 B2
(45) Date of Patent: *Aug. 9, 2005

(54) QUICK CHANGE FILTER AND BRACKET SYSTEM WITH KEY SYSTEM AND UNIVERSAL KEY OPTION

(76) Inventor: Roger P. Reid, 1904 Industrial Way, Caldwell, ID (US) 83605

( * ) Notice: Subject to any disclaimer, the term of this patent is extended or adjusted under 35 U.S.C. 154(b) by 0 days.

This patent is subject to a terminal disclaimer.

(21) Appl. No.: 10/372,040

(22) Filed: Feb. 21, 2003

(65) Prior Publication Data

US 2003/0217958 A1 Nov. 27, 2003

Related U.S. Application Data

(60) Provisional application No. 60/358,692, filed on Feb. 21, 2002.

(51) Int. Cl.[7] ........................... B01D 27/08; B01D 35/30
(52) U.S. Cl. ...................... 210/232; 210/249; 210/435; 210/444; 285/27; 285/376; 285/914
(58) Field of Search ................................ 210/232, 249, 210/435, 444, 445; 285/27, 376, 914

(56) References Cited

U.S. PATENT DOCUMENTS

| | | | |
|---|---|---|---|
| 3,107,601 A | 10/1963 | Longmire | 99/330 |
| 3,685,539 A | 8/1972 | Warren | 137/565 |
| 3,753,495 A | 8/1973 | Bjork | 210/206 |
| 3,950,251 A | 4/1976 | Hiller | 210/232 |
| 4,211,439 A | * 7/1980 | Moldestad | 285/27 |
| 4,267,042 A | 5/1981 | Hofmann | 210/169 |
| 4,877,521 A | 10/1989 | Petrucci et al. | 210/171 |
| 4,948,505 A | 8/1990 | Petrucci et al. | 210/238 |

(Continued)

FOREIGN PATENT DOCUMENTS

| | | | |
|---|---|---|---|
| DE | 19925297 C1 | 7/2000 | ................. 1/18 |
| EP | 0 269 054 | 11/1987 | ........ B01D/35/30 |

(Continued)

OTHER PUBLICATIONS

English Language version of Abstract of DE 19925297.

Primary Examiner—Thomas M. Lithgow
(74) Attorney, Agent, or Firm—Pedersen & Co., PLLC; Ken J. Pedersen; Barbara S. Pedersen

(57) ABSTRACT

A bracket system holds a filter(s) in quick-attach and quick-release fashion. Brackets are combined in modular fashion, with conduit between the brackets, to create a "bank" of filters easily changed in number, arrangement, and flow scheme. Top brackets and bottom brackets capture/support the top end and bottom end of a filter, respectively, and filter inlet and outlet ports preferably slide onto and off of cooperating tubes/ports in the bracket modules without tools or threaded connections. A retainer may pivot on and off of its respective filter, holding the filter in place and releasing the filter, respectively. After pivoting the retainer up from the filter, the filter may be lifted up off of its respective bottom module, so that the filter is substantially vertically and pivotally removable from the bracket system. A keyed system may ensure that only the appropriate filter fits into the appropriate filter holder, wherein the keyed system includes key protrusions and cooperating key recesses on the mating surfaces that form a fluid connection between the filter and the filter holder. Sets of holders and filters may be provided wherein each set has key structure at different radial locations on the members, so that filters from a particular set cannot be used with any other set's holder. A universally-keyed filter may also be supplied that has key structure that fits with and cooperates with more than one of the differently-keyed filter holders so that the universally-keyed filter may be used with the various sets' holders.

23 Claims, 12 Drawing Sheets

U.S. PATENT DOCUMENTS

| | | | |
|---|---|---|---|
| 4,956,086 A | 9/1990 | Thomsen et al. | 210/232 |
| 5,092,999 A | 3/1992 | Valenzuela et al. | 210/321.72 |
| 5,108,598 A | 4/1992 | Posner | 210/232 |
| RE34,031 E | 8/1992 | Thomsen et al. | 210/232 |
| RE34,050 E | 9/1992 | Thomsen et al. | 210/232 |
| 5,186,829 A | 2/1993 | Janik | 210/232 |
| 5,342,518 A | 8/1994 | Posner et al. | 210/232 |
| 5,397,462 A | 3/1995 | Higashijima et al. | 210/136 |
| 5,486,288 A | 1/1996 | Stanford et al. | 210/235 |
| 5,651,887 A | 7/1997 | Posner et al. | 210/232 |
| 5,766,463 A | 6/1998 | Janik et al. | 210/232 |
| 6,001,249 A | 12/1999 | Bailey et al. | 210/232 |
| 6,048,455 A | 4/2000 | Janik | 210/232 |
| 6,068,770 A | 5/2000 | Niermeyer et al. | 210/321.6 |
| 6,080,313 A | 6/2000 | Kelada | 210/631 |
| 6,187,188 B1 | 2/2001 | Janik et al. | 210/232 |
| 6,277,277 B1 | 8/2001 | Jacobi et al. | 210/240 |
| 6,458,269 B1 | 10/2002 | Bassett et al. | 210/119 |

FOREIGN PATENT DOCUMENTS

| | | | | |
|---|---|---|---|---|
| EP | 0 887 100 A1 | | 6/1988 | B01D/63/02 |
| GB | 771968 | * | 4/1957 | |
| KR | 99086940 A | | 12/1999 | 35/30 |
| WO | WO 01/64312 A1 | | 9/2001 | B01D/35/02 |
| WO | WO 01/83079 A1 | | 11/2001 | B01D/35/00 |
| WO | 03/031020 | * | 4/2003 | |

* cited by examiner

SECTION B-B

DETAIL A
SCALE 2.000

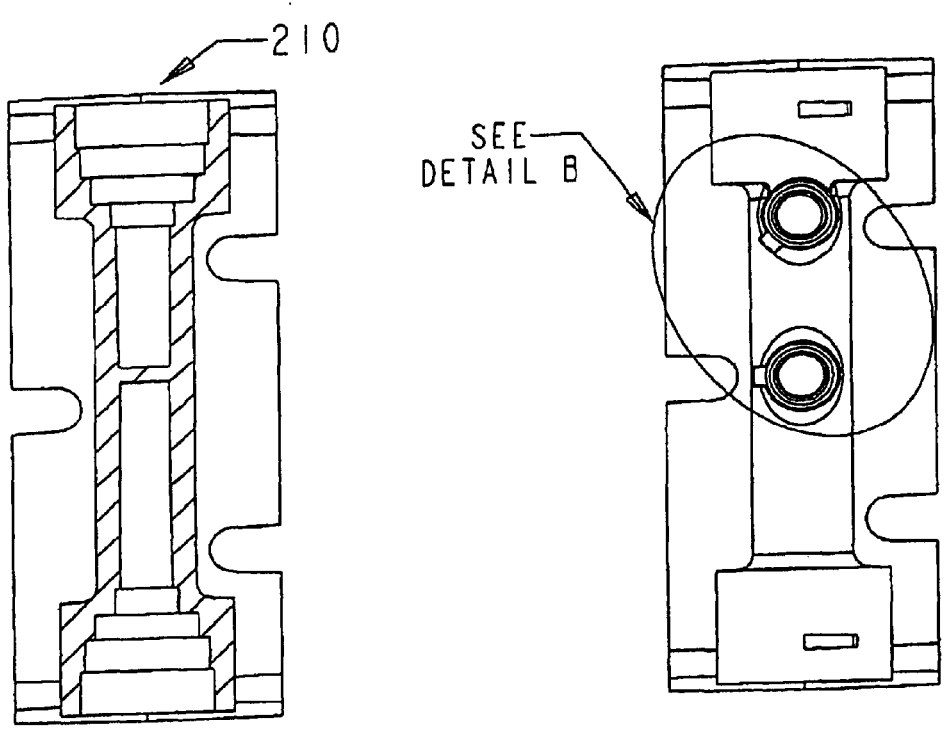
SECTION A-A
FIG. 11
FIG. 12
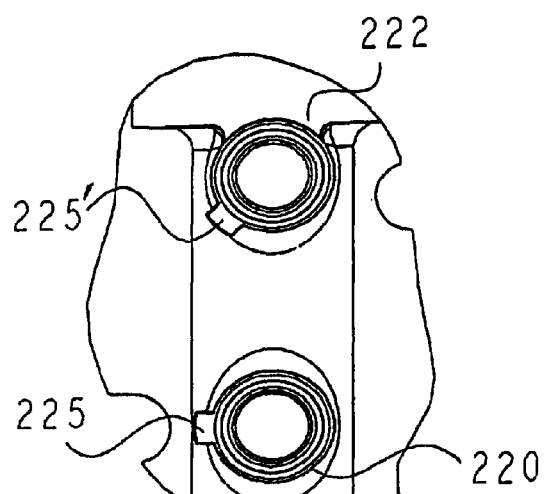
DETAIL B
SCALE 2.000
FIG. 13

QUICK CHANGE FILTER AND BRACKET SYSTEM WITH KEY SYSTEM AND UNIVERSAL KEY OPTION

This application claims priority of provisional application Ser. No. 60/358,692, filed Feb. 21, 2002, entitled "Quick Change Filter and Bracket System with Key System and Universal Key Option," which is incorporated herein by this reference.

BACKGROUND OF THE INVENTION

1. Field of the Invention

The present invention relates to brackets and piping manifolds for holding water filters, and more specifically, brackets and manifolds that allow quick change-out of the filters. The invention relates to a bracket system that may accommodate a plurality of filters in series and/or parallel flow, and is adaptable to many different flow schemes, media and liquids. The invented system used a pivotal system, wherein a top bracket pivots away from each filter so that the filters may be lifted up out of the bracket system.

2. Related Art

Manifold systems have been developed to accommodate multiple filters or water treatment tanks for increasing filter capacity and for allowing quick replacement of the filters. In 1972, Warren disclosed (U.S. Pat. No. 3,685,539) a multi-station system comprising a plurality of filters attached to a vacuum manifold. In 1973, Bjork disclosed (U.S. Pat. No. 3,753,495) a water conditioning unit with a filtering tank and a water softening tank connected to a manifold. In 1992–1994, Posner et al. disclosed a manifold system that comprises horizontally-removable filters that include a "means for effective evenly distributed filtration" that includes a first conical stage filter near the filter inlet and a second conical stage filter near the filter outlet, with a charcoal element between the conical filters. Each Posner filter is removable in a horizontal direction, that is, perpendicularly to the plane of the piping manifold, which plane is typically vertical. The Posner fittings are stationary snap-together and snap-apart connections that are parallel in fixed horizontal planes.

SUMMARY OF THE INVENTION

The present invention comprises a bracket system that holds a filter in quick-release fashion and that may comprise conduits for flow in or out of one or both ends of the filter. The bracket system may be expanded by using a plurality of brackets in modular fashion to create a "bank" of several filters. The invented system therefore features a high degree of flexibility for changing the number of filters and the flowscheme of the filter bank, including flow between two or more filters to a storage or treatment vessel that is separate from the bank of filters.

The bracket system comprises pairs of brackets. Each pair includes a top bracket and a bottom bracket, which capture the top end and bottom end of a filter, respectively. Several pairs of brackets may be positioned near each other to hold a plurality of fitters generally side-by-side or in other arrangements. Fittings are included in the brackets for sealing to the inlet and outlet ports of the filters to connect the ports to flexible tubing or other conduit. The conduit extends from the fittings to establish many different flowschemes in and out of the filters and between the filters and/or the separate storage and treatment vessels. Each bracket may be made to include fitting configurations of various types, that is:

1. One fitting, that is, a single fitting for attachment to an inlet port or an outlet port;
2. Two fittings, that is, "double fittings" for connection to both an inlet port and an outlet port; or
3. No fittings, wherein the particular bracket, either top or bottom bracket, is intended for support of the filter but not for conducting of fluid.

Single-fitting brackets are placed on both ends of flow-through filters, for example, to allow flow into the filter top end and out of the filter bottom end. Double-fitting brackets are used at one end of a central-return-tube-style filter, preferably the top end, to allow flow in and out of a single end of the filter. For such return-tube filters, the bottom bracket typically contains no fittings or conduit, because the bottom bracket serves only to support and retain the filter. Brackets intended for the various fitting configurations may be made the same or substantially the same, that is, having the basic structure for more than one configuration but having one or more fittings blocked off for use with different filters. For example, a bottom bracket may be formed to have a post that, in some flowschemes, fluidly communicates with a port in the filter, or, in other flowschemes, may have its internal passage blocked and have no attached conduit, so that there is no fluid communication. Or, the filter may have only an indentation in its bottom end rather than a port, so that a post with an internal passage still does not communication with the internals of the filter.

The brackets serve as support, securement, and quick-connect and quick-disconnect fluid conduit means. To fulfill these objects, the preferred top and bottom brackets have pivotal features that allow the filter to "clear" the brackets during removal. The top brackets are preferably adapted to pivot off of the filters, so that the filters may be lifted up off of the bottom brackets. Additionally, the bottom brackets may be pivotal, so that lifting the filters up from the bracket system is facilitated by allowing the filter to also pivot out away from the top modules. Thus, the top bracket preferably comprises a lid that has a substantial vertical component to its movement, to clamp down over the top filter connection for retaining the filter top in place, and then to move up and away from the top filter connection for removal of the filter. The bottom bracket comprises a base that vertically receives the bottom surface of the filter, and, optionally, a vertical fitting for forming a fluid connection with the bottom of a flow-through filter.

Preferred Key System

Preferred embodiments include a key system wherein a portion of a fluid cartridge-holder connection is structurally adapted so that only matched filter cartridges and holders can cooperate to allow installation of the filter cartridge in the holder and/or to form a fluid seal. In other words, each filter cartridge and holder combination or "set" is "keyed" so that only that particular filter cartridge design mates with that holder. According to the invention, there are created various cartridge-holder sets that each have the adaptation, but the adaptation is slightly offset for each set compared to the other sets. This way, a filter cartridge from one set may not be mixed with a cartridge from another set, and, therefore, a filter cartridge may not be installed on any but its own matching holder.

The adaptation preferably involves a varying location of a "key" protrusion and a "lock" recess combination, such as a tab-slot combination, typically with mating protrusion(s) and recess(es) being at a certain angle on a circumference for one cartridge-holder set and a mating protrusion(s) and recess(s) of a similar or identical shape being at a different angle on the circumference for another cartridge-holder set, and so on, for each similarly-shaped-but-differently-located-adaptation cartridge and holder set. In other words, the key protrusion and the lock recess are selectably locateable around cooperating perimeters of a filter cartridge and its holder. The key and lock structures (hereafter typically called "key protrusion" or "protrusion" and "lock recess" or "recess," respectively) are preferably rigidly molded or otherwise permanently placed on/in the filter cartridge and holder, and so they are not considered moveable. They are, however, easily changed in the molding or other manufacturing process, that is, they are easily selectable by locating them at different angles/locations around a circumferential surface.

This system may include a plurality of sets of filters and holders, each set having a differently-located key and lock, wherein the key and lock of each set cooperate with each other to allow that filter to be installed in that holder, but that filter may not be installed in any other holder because the key or lock of that filter does not cooperate with the key or lock of the other holder. The term "key or lock" is used because the key protrusions may be placed on either the filter or the holder, and the lock recess may therefore be placed on the other item.

Thus, for example, a water or beverage filtration facility, experimental pilot plant, or other filter user may control filter cartridge placement accurately. A facility with multiple, different filtering applications may have filter cartridges on hand for each of the applications, but the cartridges will not be confused. For example, in a facility in which there are two different applications, many of the two different types of filter cartridges may be kept in stock and even may be mixed during storage or handling, but the filter cartridges will not be mixed when installed into the filter holders. This is because the filter holder and the filter cartridges for the first application are "keyed" differently than the filter holder and the filter cartridges for the second application. The terms "keying" or "keyed" refer generally to how and where the entire key system is located or accomplished, that is, to the positioning or style of either one or both of the cooperating key and lock structures, rather than specifically to only the location of the "key protrusion." All the filter cartridges for the first application are keyed the same, that is, to match the first application holder, and all the filter cartridges for the second application are keyed the same, to match the second application holder. The keying for the first application and the keying for the second application does not need to be very different, but may be merely, for example, a slightly different angular position for the two protrusions and recesses.

Also, a filter manufacturer may control his product lines more carefully by using the invented key system. A manufacturer may key his holders and filter cartridges differently for different countries, different clients, different distributors, or for different time periods. This technique may be used to prevent unauthorized or low-quality copies of the manufacturer's filter cartridges from easily being made. With so many differently-keyed cartridges in the marketplace provided by the original manufacturer, the incentive to provide cheap, low quality copies will be minimized, due to the expense of retooling for each "key and lock" set.

The key system may include many different protrusion and recess structures, for example, tabs and slots (typically thin or elongated bar and channel structures or elongated dove-tail structures), bumps and holes (typically rounded or mounded structures with cooperating valleys or holes), wedges and wedge-shaped wells (typically circular section structures); and many other shapes.

Preferably, the invented system also includes an optional universal key feature that may be supplied to the client/customer, wherein a single "universal cartridge" is made that may be used on a plurality of differently-keyed filter holders. The "universal" cartridge may be, for example, a cleaning cartridge, a sanitization cartridge, a media regeneration cartridge, a special treatment cartridge, or a testing cartridge, wherein it is more convenient and economical for the user to have a universal cartridge fitting all of the user's or manufacture's variously-keyed holders. This may be, for example, because the user wants to use a single universal cartridge for cleaning of all his various filtration or treatment processes and does not want to invest in differently-keyed cleaning cartridges for each differently-keyed holder. Also, this way, a manufacturer that supplies different customers with large volumes of differently-keyed holders and cartridges (for their main filtration and treatment process) may supply all the customers with the same universal-key cartridge for special or infrequent processes such as cleaning or media regeneration. This allows the manufacturer to maintain profitability even on the small volumes of cleaning or other infrequent-use cartridges that are required, by saving the expense of manufacturing and monitoring proper shipment of many differently-keyed cleaning cartridges.

The universal cartridge includes a "lock recess" or "key protrusion" (depending on whether the system is a recess-on-cartridge or a protrusion-on-cartridge system) at every location where any of the holders involved have a corresponding recess or protrusion. For example, if a manufacturer produces holders and cartridges that are keyed with recesses and protrusions at 30 degree increments, the universal cartridge for the holders involved will have recesses or protrusions at every 30 degrees. For example, if a manufacturer produces holders and cartridges that have recesses and protrusions on fluid connectors at 12 o'clock and 5 o'clock for one client and at 3 o'clock and 11 o'clock for another client, that manufacturer may produce a universal cleaning cartridge with recesses or protrusions at all of the positions of 12, 3, 5, and 11 o'clock.

BRIEF DESCRIPTION OF THE DRAWINGS

FIG. 11 is a front, cross-sectional view of the filter holder of FIGS. 6–10, viewed along the line A—A in FIG. 9.

FIG. 12 is a front view of the filter holder of FIGS. 6–11.

FIG. 13 is a detail view of the inlet and outlet tubes of the filter holder of FIGS. 6–12, viewed as detail B of FIG. 12.

FIG. 18b is a top view of the holder in FIG. 18a.

FIG. 19b is a top view of the embodiment of FIG. 19a.

FIG. 20b is a top view of the holder in FIG. 20a.

FIG. 21b is a top view of the embodiment of FIG. 20a.

DESCRIPTION OF THE PREFERRED EMBODIMENTS

Figure 1:
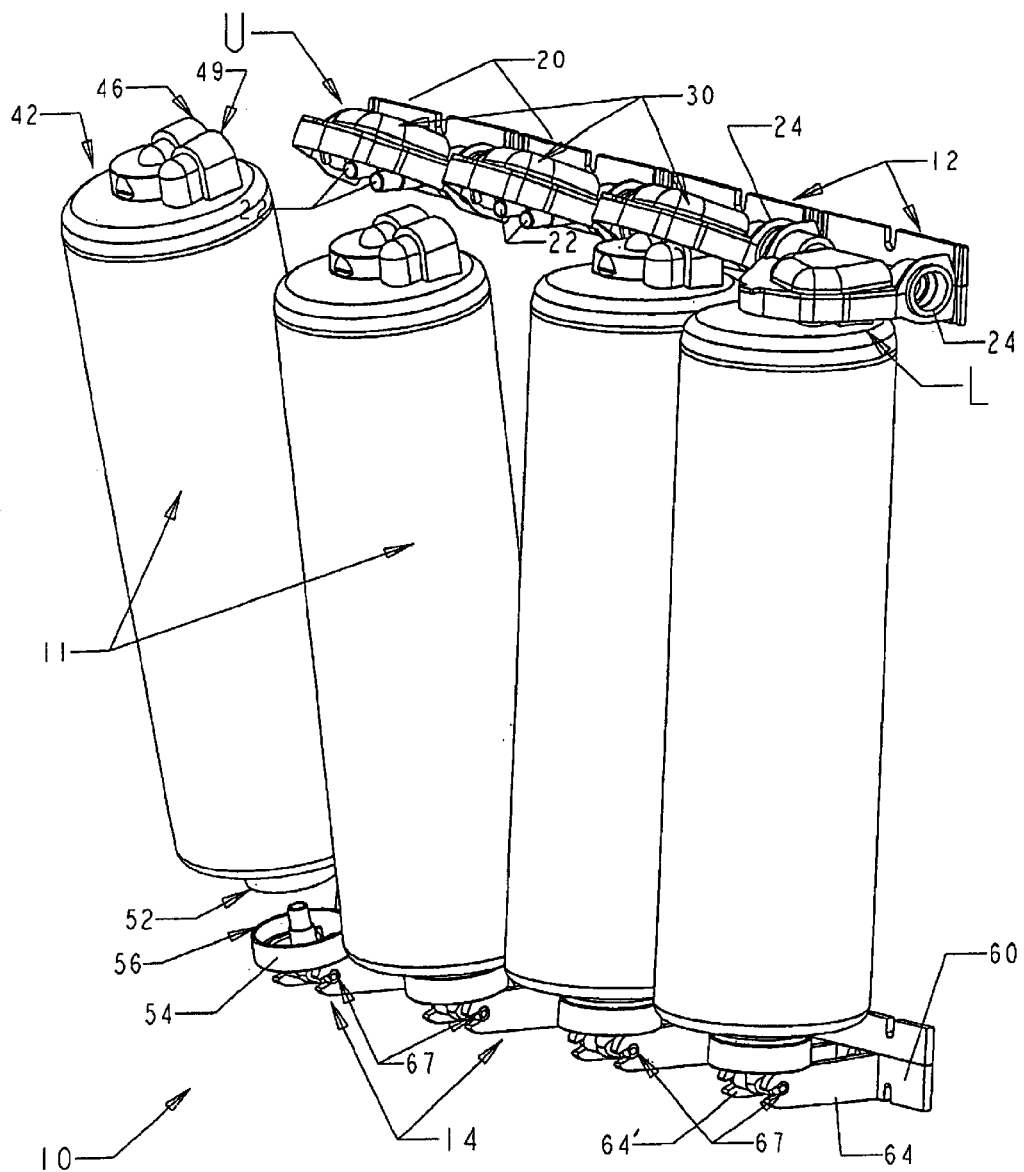
FIG. 1 is a side perspective view of one embodiment of the invention, which comprises four pairs of brackets, with four filters in various stages of removal, the brackets being shown without tubing between the brackets.

Referring to the Figures, there are shown several, but not the only, embodiments of invented bracket and filter system. FIG. 1 illustrates a four-filter system 10 having four pairs of brackets, comprising four top brackets 12 and four bottom brackets 14 that are arranged side-by-side ("aligned") in two parallel horizontal rows. Alternative arrangements may include non-aligned locations for the brackets with a variety of spacings and patterns, as long as the top bracket and the bottom bracket of each pair of brackets are appropriately spaced apart vertically to receive the filter 11. Each pair of brackets may be located generally independently of the others as long as the conduit between them and to/from intermediate storage and treatment is long enough. This allows a great variety of arrangements and spacings, as well as many flowschemes and liquid treatment options.

Figure 2:
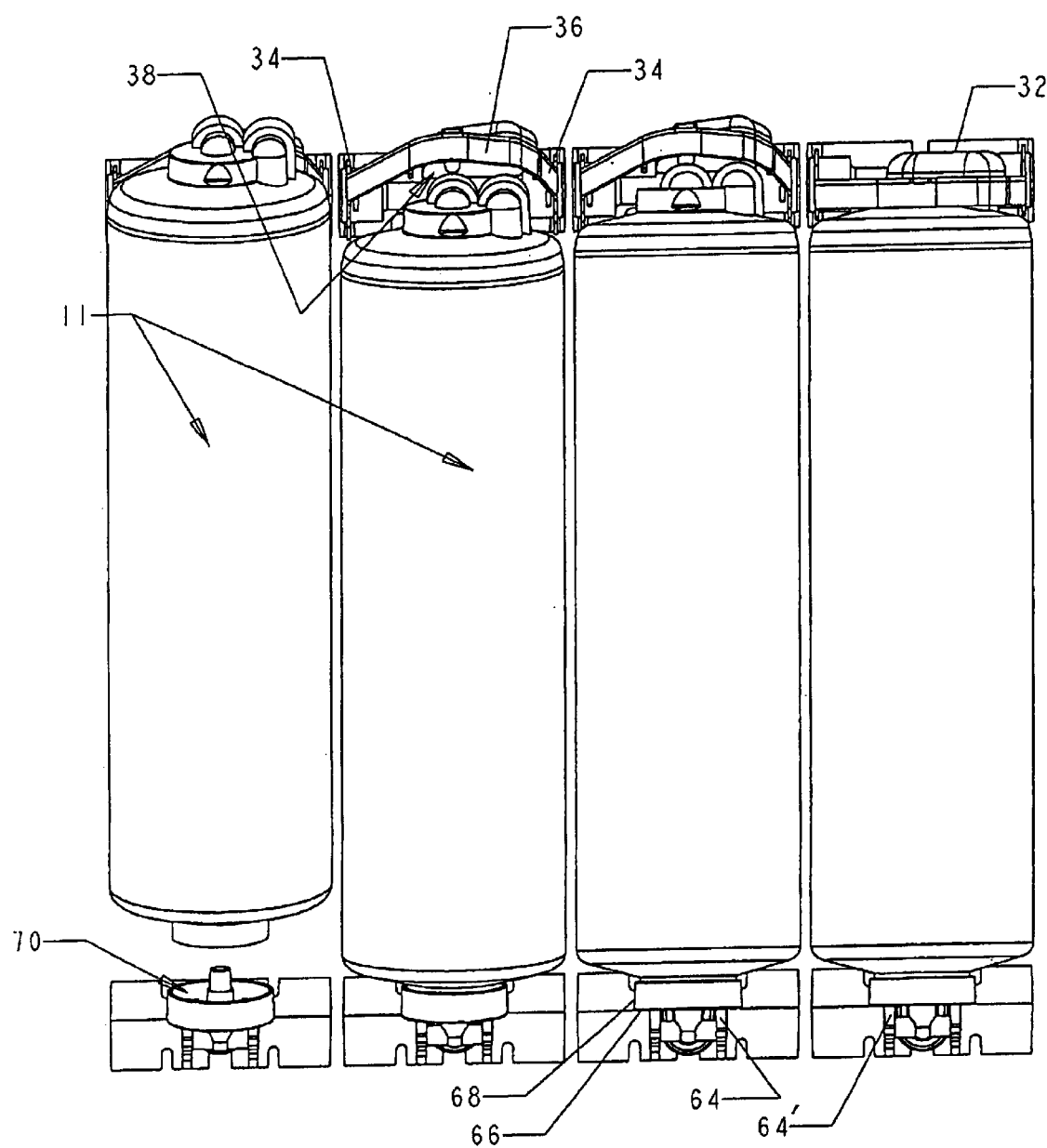
FIG. 2 is a front view of the filters and brackets of FIG. 1.

As may be seen in FIGS. 1 and 2, each top bracket 12 comprises at its rear an attachment plate 20 for attachment to a wall or other preferably vertical surface. Connected to the plate are two side-by-side fittings, one for fluid flow into the filter and one for fluid flow out of the filter. Each of the fittings has a first end 22 and a second end 24, wherein the first ends are tubular protrusions extending out from the bracket generally horizontally toward the front of the bracket for connection to the inlet port and outlet port of a filter. The fittings extend back from their first ends 22 and preferably bend at about 90° to turn opposite directions to place their second ends 24 at opposite sides of the bracket. The second ends 24 are adapted for connection to conduit 40 (not shown in FIGS. 1, 2, and 3, but shown in FIGS. 4B, 5A, and 5B), which is preferably flexible tubing, but may also be a rigid tube, pipe, or other connector. Flexible tubing is normally used for flow schemes in which the conduit runs from the top bracket to some location other than another top bracket immediately adjacent, because the conduit normally includes several bends and curves. For example, the flexible tubing may extend from the first top bracket to a storage tank, and then back to a top bracket or to a bottom bracket. For conduit paths that require few or no bends/curves, rigid or partially rigid conduit is effective. For example, a rigid connector may extend straight from a second end of one top bracket to an adjacent second end of an adjacent top bracket. An example of a rigid tube connector may be two collet-style connectors joined by a short length of pipe or flexible tubing.

In embodiments in which the two first ends are side-by-side parallel to each other, the two second ends are preferably opposite-facing on the same axis. Each of the two fittings of the top bracket is preferably isolated from the other, in that fluid must flow through one bracket into the filter, and through the filter to reach the other fitting and out to another bracket or separate storage/treatment. Alternatively, if a bracket is temporarily not to be used for a filter, the inventor envisions that a jumper tube or connector may be installed between the two fittings to allow flow from one fitting to the other without going through a filter.

Also, the inventor envisions that, instead of bending at 90°, fittings may extend straight back from the first ends 22 through the attachment plate 20 for connection to conduit 40 behind or passing through attachment plate. This would be practical for embodiments designed to hang on a grid or other non-solid surface that would allow conduit to pass back and forward through the grid.

The top bracket 12 includes a lid 30 pivotally connected to the attachment plate 20, by way of one or more arms rotatably disposed around the fittings near the second ends. The lid 30 is generally an inverted-cup-shape with a top wall 32, side walls 34, front wall 36, and an interior space 38. The lid pivots between a raised position, as indicated at "U" (for up), to a lowered position indicated at "D" (for down). With the lid in the raised position, the first ends of the fittings and the top end 42 of the filter (especially the inlet port 44 and outlet port 46) are exposed, and the filter may be pulled away from the fittings. In the lowered position, the lid is lowered over the first ends and the filter ports 44, 46, in effect, enclosing the fitting-port connection on the top, front, and two sides. In this lowered position, the lid and especially the front wall 36, retains the filter top end 42 in the bracket 12, because it cannot be pulled out or fall out from the fittings. Preferably, an elastic band (not shown) or other biasing member is installed to bias the lid into the lowered position. This way, a person my temporarily raise the lid to remove a filter top end, but, as soon as he/she lets go of the lid, it snaps back down, pivoting relative to the attachment plate and the fittings to rest in the lowered position.

The bottom bracket 14 that is adapted for cooperation with the double-fitting top bracket discussed above does not need to include a fitting for connection to a port. Because both inlet and outlet fittings, in such an embodiment, are positioned at the top bracket, the bottom bracket need only be a support system for the bottom end 52 of the filter. For such embodiments, the base 54 and its post 56 do not carry fluid or convey fluid to conduits or other filters or vessels, but rather serve for support, alignment, and securement of the filter. The base 54 portrayed in FIGS. 1 and 2 includes a post 56 that may be received in an indentation in the bottom of the filter for alignment of the filter in the base, but in an embodiment in which the filter top end 42 includes both inlet and outlet ports 44, 46, the indentation is not a port and the indentation, and therefore the post, are not in fluid communication with the filter.

The bottom bracket 14 has a rear attachment plate 60 for attachment to the vertical wall and two spaced arms 64, 64' that extend out from the plate 60. Pivotally connected to the arms 64, 64' is the base 54 with a bottom wall 66 and a side wall 68 surrounding and defining an interior space 70 for receiving the bottom end 52 of the filter. The base 54 is biased by an elastic band (not shown) or other member to remain in a position with the base generally on a horizontal plane and vertically receiving the filter. When force is applied to pivot the base, it pivots on a horizontal axis that is parallel to the plate of the bracket, to a tilted position slightly outward away from the plate. This pivoting typically occurs when the filter top end is pivoted out slightly away from the top bracket so that the filter clears the top bracket when lifted up out of the bottom bracket (see two filters on left of FIGS. 1 and 2). In some embodiments, it is envisioned there may be room for some pivoting of the filter bottom end relative to the base, but, in most embodiments, it is preferred that the filter have a close fit in the base and is not pivotal relative to the base. Therefore, when the filter is tilted outward, the base pivots outward with it, typically about 15–25° from a vertical plane. The filter is then lifted up out of the base at that angle relative to vertical, which may reasonably be considered generally vertically. The biasing member returns the base to its upright position after the filter is removed.

Figure 3:
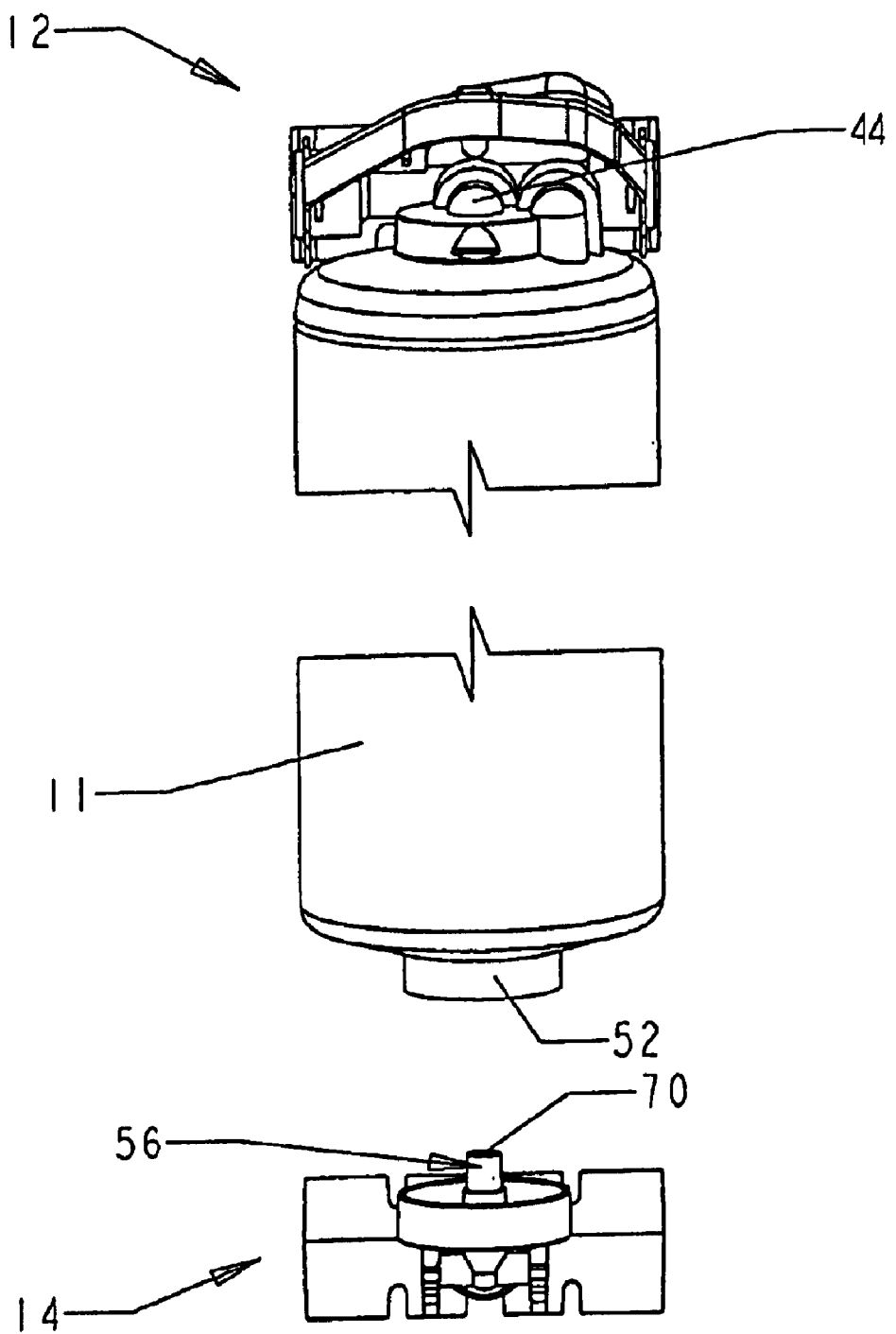
FIG. 3 is a front view of an embodiment of a bottom bracket, filter top, and top bracket for a down-flow filter system.

For alternative embodiments, in which the filter top and top bracket have only one fitting and port 44, or no fittings or port, the bottom bracket is adapted to carry and direct fluid in and/or out of the filter. In embodiments in which the bottom bracket includes one fitting for a filter port, the bottom bracket preferably includes tubular post 56 in the center of the base, as illustrated by FIG. 3. The post upends into the interior space to be slidably received in a port in the filter bottom end 52. The post upends perpendicularly from the base bottom surface, to be vertical when the base is in its upright position. The port into which the post is received runs axially into the filter, preferably at the central axis of the filter. The post's axial fluid passage 70 is thereby placed in fluid communication with the filter and serves as a fitting for connection to conduit for conducting fluid to/from the filter.

An effective system using a fluid-conducting bottom bracket is to have fluid enter the filter top end via a top bracket fitting and a top inlet port 44, flow down through the filter 11 either in axial and/or radial flow to a bottom outlet port. From the bottom outlet port, fluid flows into the hollow post 56 in the base, to a conduit 40 that conducts the fluid to another bracket (either top or bottom) or intermediate storage or treatment. Alternatively, the post may serve as an inlet to the filter, which would then be a flow up filter.

Alternatively, the bottom bracket may include both an inlet and an outlet fitting, for embodiments in which the top bracket does not include any fluid fitting or conduit. This could be accomplished by providing two vertical posts upending from the base and in fluid communication with an inlet and outlet port in the bottom end of the filter, for example, an inlet offset from the central axis of the filter and the outlet at the central axis of the filter.

Figure 4A:
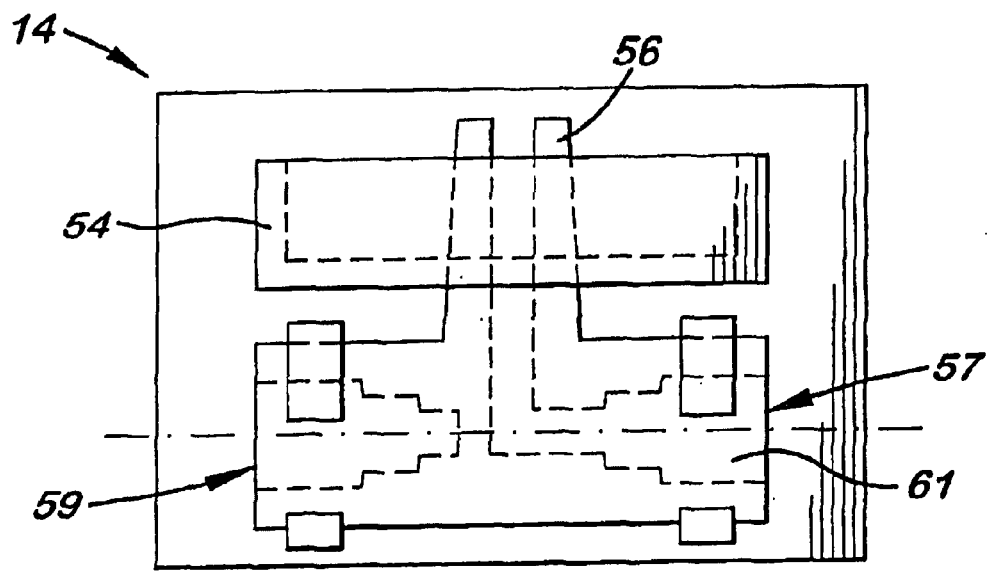
FIG. 4A is a schematic front view of one embodiment of a bottom bracket, including one side-extending fitting and a blocked opposite-side fitting.
Figure 4B:
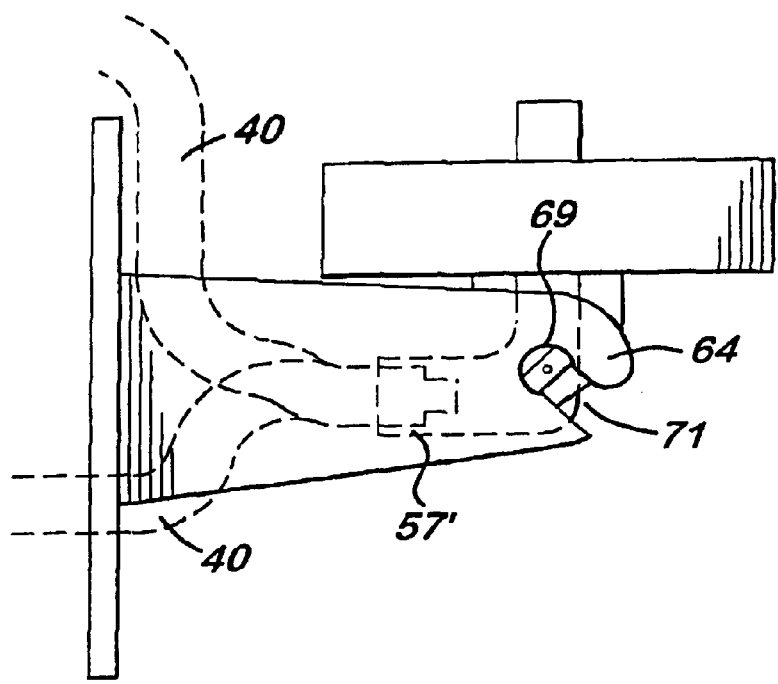
FIG. 4B is a schematic side view of another embodiment of a bottom bracket with one rearward-extending fitting and flexible tubing illustrated as extending in two alternate directions.
Figure 5A:
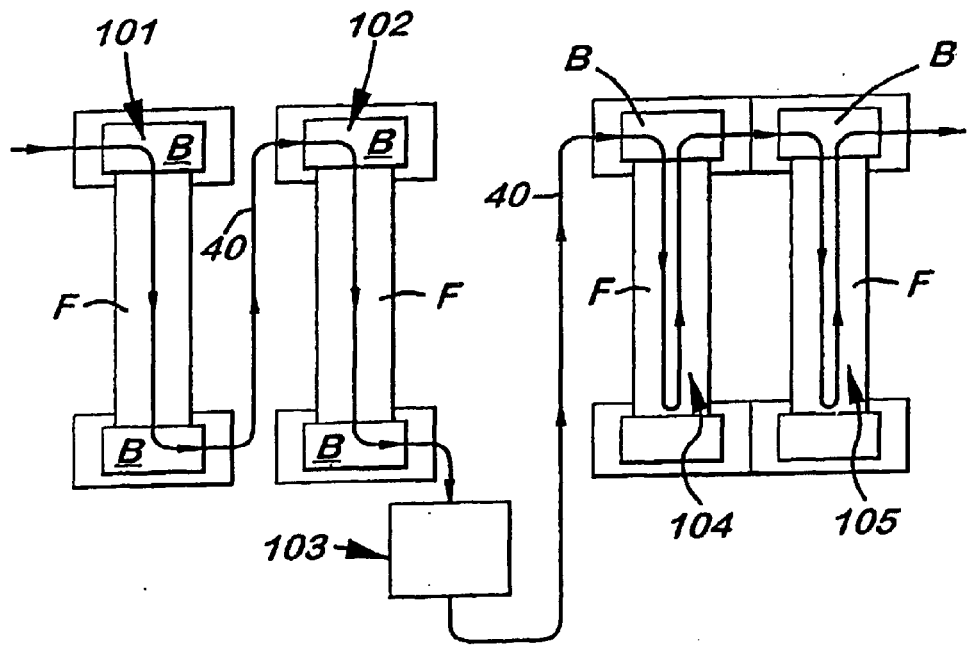
FIG. 5A is a schematic of one embodiment of a flow scheme possible according to the invention, which includes two pairs of brackets with an inlet at the top and an outlet at the bottom and two pairs of brackets with both inlet and outlet in the top bracket, and intermediate storage or treatment.
Figure 5B:
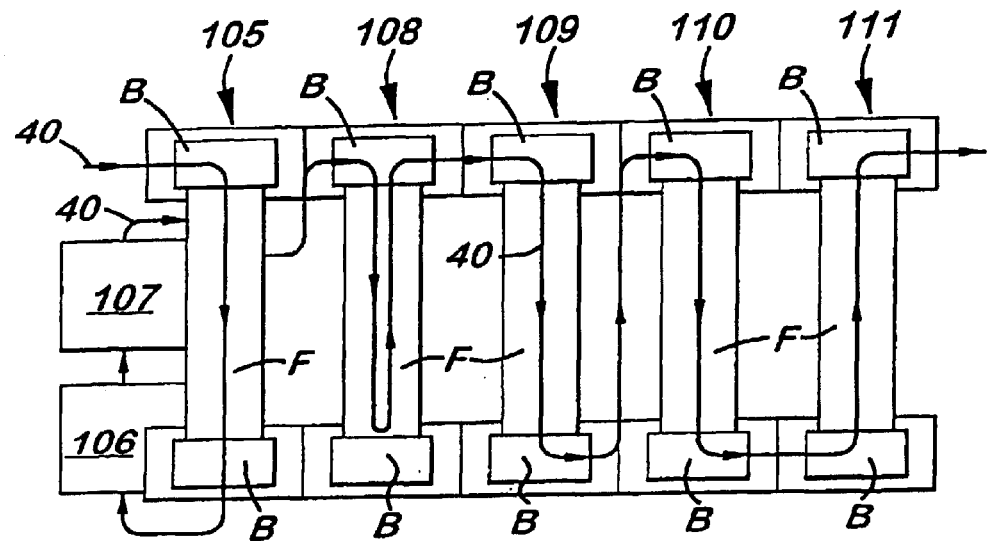
FIG. 5B is a schematic flow diagram of another embodiment of the invention, including 5 filters in series with intermediate storage/treatment after the first filter, and each filter and its respective brackets featuring a different flow direction and/or fitting location.

As illustrated schematically in FIGS. 4A and 4B, the post represents the first end of the bottom bracket fitting, which further includes a second end 57 adapted for connection to the conduit 40. Various fitting styles may be provided on the bottom bracket fitting second ends. FIG. 4A illustrates schematically a bottom bracket 12 with a fitting extending from its first end (post 56) to bend about 90° to open at its second end 57 at the side. In this embodiment, the fitting second end 57 and a protrusion 59 opposite the second end both pivot in the arms, so that the pivotal axis extends through the central cavity 61 of the fitting second end.

FIG. 4B shows an embodiment in which the fitting second end 57' extends in an L-shape rearward and transverse to the pivotal axis. In such an embodiment, the fitting second end 57' conveniently connects to a flexible tubing 40 that extends back through the plate 60, or through a grid wall. Or, the tubing may extend up to loop up to a top bracket of the adjacent filter or to intermediate storage/treatment.

Several of many flow schemes are possible with the invented system shown schematically in FIGS. 4A and 4B.

Filters of many designs and contents may be used with the invented bracket system. For example, down flow (either radial and/or axial), up flow (either radial and/or axial), or central return tube styles with both inlet and outlet at one end may be used. Many filtration and treatment media may be used including carbons, bolides, blocks, granules, fibrous, or other materials and/or even media void spaces.

The base 54 of the bottom bracket illustrated in FIGS. 1, 2 and 4B is preferably removable from the plate, by means of a snap-in or slide-in connection between the base and the arms 64, 64'. As shown in FIGS. 1 and 4B, the pivotal members 67 received in holes 69 in the arms are flattened. When the base is pivoted about 90°, the flattened pivotal members 67 align their lengths with the slot opening 71 leading out from the holes in the arms, and can then slide out of the arms. This feature, or other removable adaptation, allows one to remove the base with its fitting for maintenance or replacement.

Preferred Embodiment of Top Bracket

FIGS. 6–12 illustrate a particularly preferred version of a piece of the top bracket 12, with tubular connector for connecting to a filter cartridge top. Bracket member 210 is the piece that seals with, and fluidly-communicates with, a filter cartridge at its top end. It is the two tubular connectors, therefore, that create a physical connection and fluid communication between the bracket and cartridge, and the lid 30 (not shown in FIGS. 6–12) helps lock the filter onto the tubular connectors. The bracket member 210 shown in FIGS. 6–12 includes both inlet and outlet tubular connectors, for conducting fluid both into and out of the filter cartridge. Thus, the bottom bracket corresponding to such an embodiment would not include any fluid communication ports/tubular connectors.

The bracket 210 shown in FIGS. 6–12 includes, as an option but not a necessity, a keyed system to control what filters are inserted into particular brackets. The keyed system includes tabs that protrude from the inlet and outlet tubular connectors that would be part of a keyed system, to make the tubular connectors' outer surface not perfectly cylindrical, wherein the protruding tabs would be sized to fit into correspondingly positioned and properly sized slots in the inner surface of the filter cartridge ports. Thus, the tabs of the tubular connectors (shown) and the slots (not shown) of the filter cartridge ports, therefore, may form a "key system" which can be used to keep unauthorized or improper filter cartridges from being placed on a particular bracket 210. For various sets of brackets and their proper filter cartridges, the tab and slot location/position would be differently arranged, so, for example, a "Type A" filter cartridge could only be inserted into a "Type A" bracket, and a "Type B" filter cartridge could only be inserted into a "Type B" bracket. Type A could be a pre-filter, for example, and its tab and slot could be positioned, for example, at "one-o'clock on the tubular connectors and ports. Type B could be a microbial treatment filter cartridge, for example, and its tubular connectors and ports, for example, could be positioned at "four o'clock." Thus, by placement of the Type A and Type B brackets in a particular order, one could ensure that the cartridges are always in the correct order.

Figure 6:
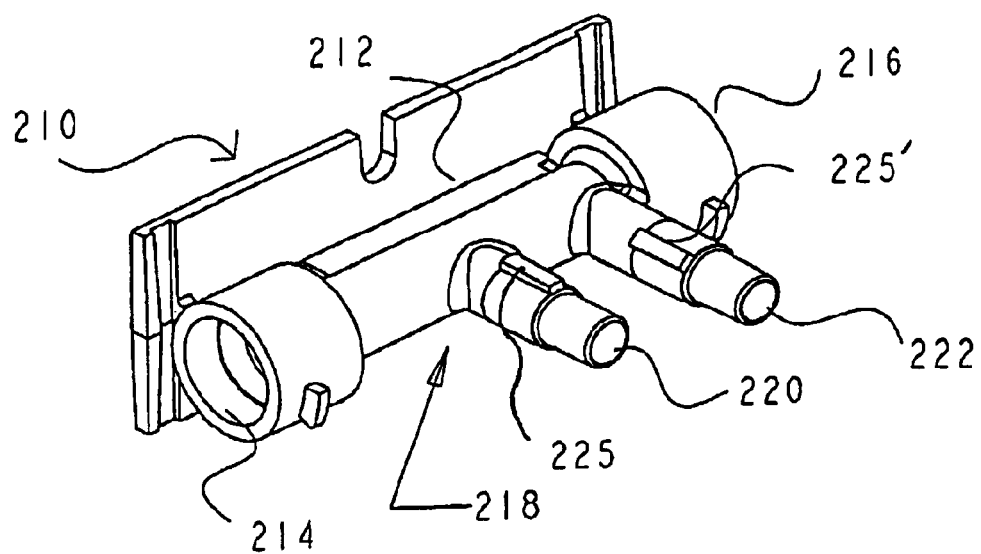
FIG. 6 is a perspective view on an alternative embodiment of a filter holder, a bracket with keyed structure on connection tubes that connect to and fluidly seal to an alternative embodiment of filter cartridge.

In FIG. 6 is shown the bracket 210 that serves several function: mounting means for securing the bracket to a wall of other surface, fluid receiving means, inlet tube for conveying liquid to the filter connected; outlet tube for conveying liquid from the filter; and fluid dispensing means for sending the filtered/treated liquid downstream to another filter, process, storage, or use. Specifically, plate 212 may be attached to a wall or other surface for supporting several brackets in various flow configurations. Inlet 214 and outlet 216 are at opposite ends of a conduit device 218, and may be used so that inlet 214 receives fluid from an upstream pipe or other conduit and that outlet 216 delivers filtered fluid (that has exited the filter cartridge) to its downstream destination. The conduit device 218 directs flow into the inlet tube 220 so that the fluid may flow into the filter cartridge, and then receives flow from the cartridge into the outlet tube 222 so that it may flow out through outlet 216.

Figure 7:
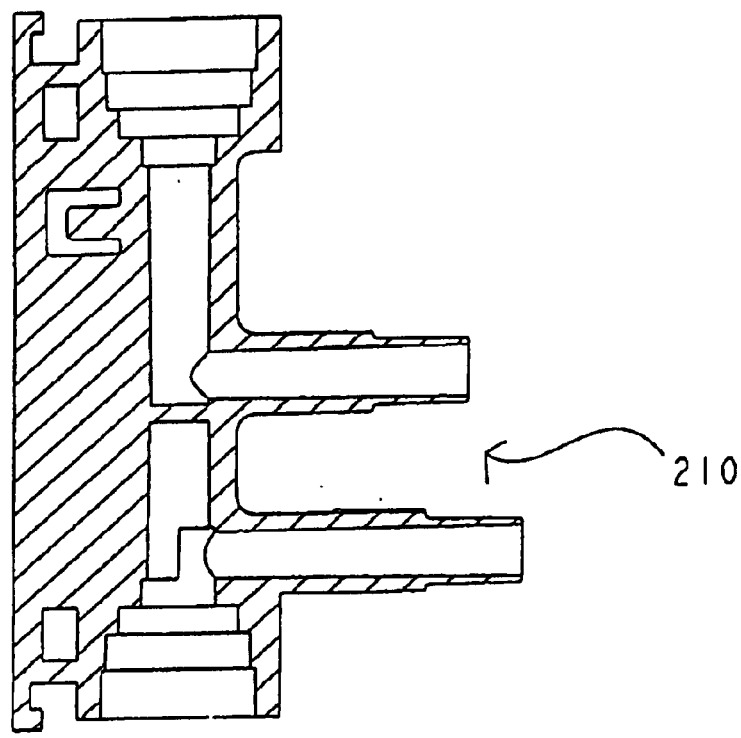
FIG. 7 is a bottom, cross-sectional view of the filter holder of FIG. 6, viewed along the lines B—B in FIG. 8.
Figure 8:
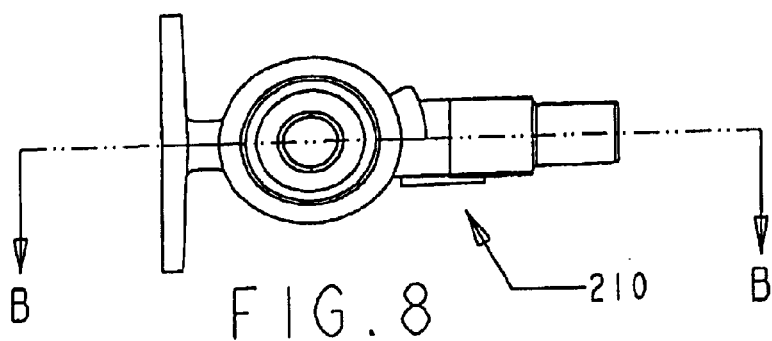
FIG. 8 is an end view of the filter holder of FIGS. 6 and 7.
Figure 9:
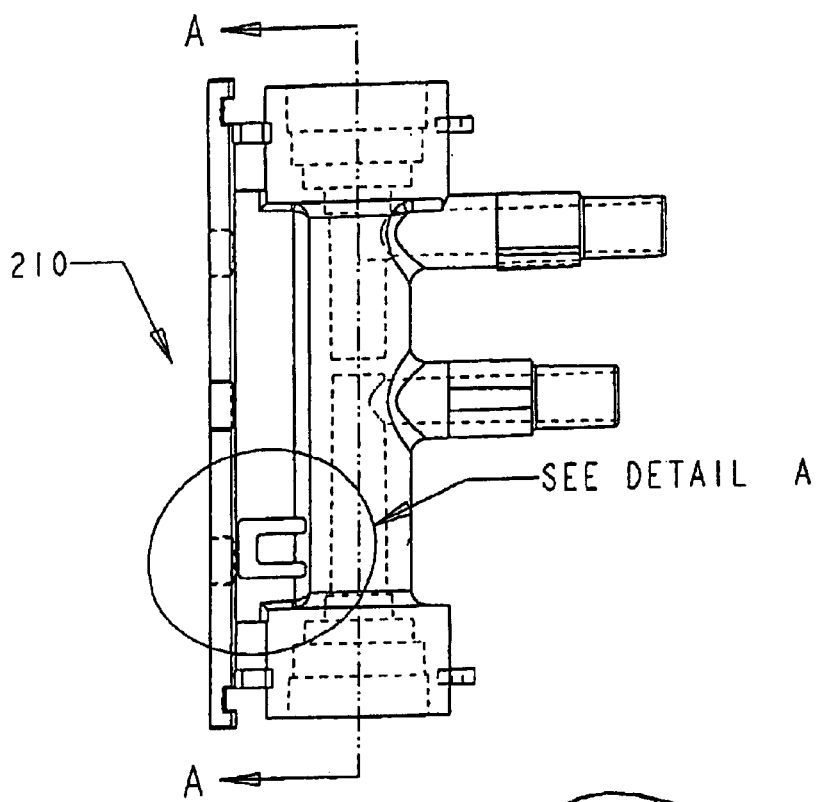
FIG. 9 is a top view of the filter holder of FIGS. 6–8.
Figure 10:
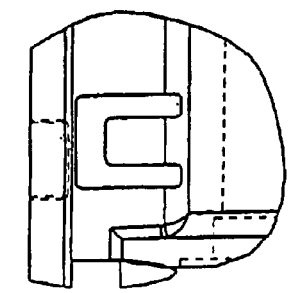
FIG. 10 is a detail view of Section A of FIG. 9, of the filter holder of FIGS. 6–9.

As part of the preferred, but not necessary, key system, male tubes 220 and 222 have "stand out" or tabs 225,225' on their outer cylindrical surfaces for a key system, such as discussed above, which are preferred but not required. As best seen in FIGS. 6 and 7, tube 220 and tube 222 have tabs 225, 225' protruding about 30 degrees offset from each other (tab 225 of tube 220 out to the left in FIG. 14 and tab 225' of tube 222 down about 30 degrees from the tab 225 of tube 220). The cooperating filter cartridge 228 shown schematically in FIG. 15 has female inlet and outlet tubes 230 and 232 (which may also be called an inlet port and outlet port), and one may notice that tubes 230 and 232 have matched or "mating" internal slots 227, 227' to receive the tabs 225, 225'. Alternatively, of course, filter cartridges might be made with male tubes and tabs and cooperating holders may be made with female tubes and slots.

The bracket 10 in FIGS. 6–13 typically is installed in a process with the plate 212 vertically attached to a vertical wall. Thus, tubes 220 and 222 extend out horizontally, and the filter cartridge is pushed onto the tubes 220, 222 so that the tubes 220 and 222 support and connect with the filter cartridge. Associated with the tubes 220, 222, 230, 232 are o-rings or other sealing structure to provide liquid-tight communication between the bracket and the cartridge. Although it is not shown, one may see from FIGS. 6–13 that liquid-tight seals are made between piping or other conduit and the inlet 214 and outlet 216. Additionally, a fastening device may be added to further secure the cartridge in sealed relationship with the tubes 220, 222, such as lid 30.

Figure 15:
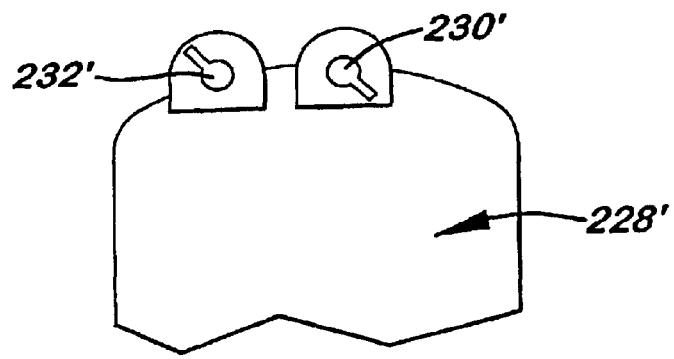
FIG. 15 is a partial side view of a filter cartridge of the type cooperating with the filter holder of FIGS. 6–13, but with an alternatively-angled key system structure.
Figure 16:
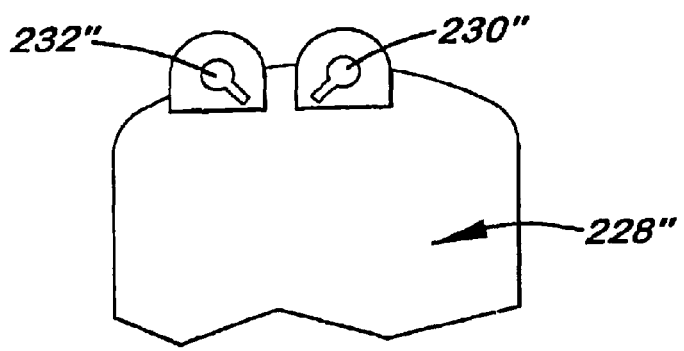
FIG. 16 is a partial side view of a filter cartridge of the type cooperating with the filter holder of FIGS. 6–13, but with an alternatively-angled key system structure.

One may see that, by varying the radial location of the tabs and slots, one could arrive at many "keys" and "locks" for the cartridge-holder sets. For example a holder could have an inlet tube with a tab at 60 degrees from a reference point and the outlet tube could have a tab at 120 degrees relative to that reference point, as long as the proper cartridge for that holder is made with the same offset and the same absolute location of slots. FIGS. 6–14 illustrate only one set of the many possible combinations of possible tab radial locations, which are extremely numerous because the radial location of each of the tubes may be varied in each set, and may be varied independently. FIGS. 151 and 16 illustrate two of the many other possible key system structures. For example, in the top end of elongated filter cartridge 228' of FIG. 15, the female inlet tube (port) 230' is keyed at about 110 degrees, and the female outlet tube (port) 232' is keyed at about 290 degrees. In the top end of elongated filter cartridge 228" of FIG. 16, the inlet tube 230" is keyed at about 195 degrees and the outlet tube 232" is keyed at about 170 degrees.

The bracket 10 in FIGS. 12–19 typically is installed in a process with the plate 212 vertically attached to a vertical wall. Thus, tubes 220 and 222 extend out horizontally, and the filter cartridge is pushed onto the tubes 220, 222 so that the tubes 220 and 222 support and connect with the filter cartridge. Associated with the tubes 220, 222, 230, 232 are o-rings or other sealing structure to provide liquid-tight communication between the bracket and the cartridge. Although it is not shown, one may see from FIGS. 12–19 that liquid-tight seals are made between piping or other conduit and the inlet 214 and outlet 216. Additionally, a fastening device may be added to further secure the cartridge in sealed relationship with the tubes 220, 222.

Key System with Universal Key Feature

General Comments

In general, key system structures are located on surfaces of surfaces of filter cartridges (or "filters") and holders that contact each other during connection of the cartridge to the holder. This may be either surfaces that are involved in mainly providing a physical connection between the cartridge and holder or that also are involved in providing a fluid connection between the cartridge and the holder.

The preferred keyed system detailed herein involves the structure that create a fluid seal between the filter cartridge and the holder, for example, the inlet and outlet ports of the filter cartridge and the respective, cooperating ports/tubes in the holder that convey liquid to and from the cartridge. In this type of embodiment, the protruding and recessed structures are located around the inner and outer circumference of a tubular connector, comprising a male tube and female receiver, that allow connection of the filter cartridge and the holder, wherein fluid is conducted through the tubular conductor(s) once the cartridge seals to the holder. An example of such a tubular connector key system includes one in which both the filter holder's inlet and outlet and both the filter cartridge's inlet and outlet are all tubular and are all keyed. For example, a filter holder's inlet tube and an outlet tube (that direct flow to a cartridge and from the cartridge, respectively) each have an elongated axial tab that protrudes out from the outer cylindrical surface of the inlet tube and outlet tube at a chosen circumferential (also called "radial" or "angular" to imply non-axial) location or locations (that is, at different places on the circumference of the tube surfaces). Likewise, the inner cylindrical surfaces of the cartridge's cooperating female tubes (into which the holder inlet tube and outlet tube slide and seal) have channels or "slots" recessed into the surfaces at corresponding circumferential positions. This way, the holder inlet and outlet tubes slide into the cartridge ports, with the holder tabs sliding into the cartridge slots without significant resistance. Another cartridge with slots at a different circumferential location, on either one of its ports, would not receive the holder tubes and, hence, could not be accidentally or incorrectly installed in that particular holder. In such a case, where the filter cartridge has two tubes (inlet and outlet ports), each of the ports could have a different slot circumferential location, as long as the holder is made to match. For example, the holder's inlet tube tab (and corresponding slot on the cartridge inlet port) could be at "straight up" at 0 degrees, while the tab on the holder's outlet tube (and corresponding slot on the cartridge outlet port) could be at 30 degrees offset relative to the inlet tabs and slots. With this type of system, for example, varying additional different cartridge and holder sets each by an additional 30 degrees, many different sets of keyed cartridges and cooperating holders may be made. Many other amounts besides 30 degrees could be chosen, but this amount of offset gives many different combinations while providing an offset easily seen and judged by a person. The inlet tabs and slots and the outlet tabs and slots may be varied independently, for example, many sets may have the inlet tabs and slots at zero (0) degrees, while the sets may have differently-positioned outlet tabs and slots. Or, sets may have inlet tabs and slots that vary from set to set by 10 degrees, while those sets' outlet tabs and slots may vary by 15 degrees, for example. The mathematics of such a system suggest that practically an "endless" number of sets with different key system structures may be designed.

Other keyed system styles, besides the tubular connector type, are envisioned. In keyed systems, in general, generally flat or smooth surfaces of the filter cartridge and the holder that conventionally would contact each other to instead include a key system structure that ensures that only a particular type of filter cartridge may be installed in a particular holder. The key system structure of the various sets of filter cartridge and cooperating holders/valve-heads is typically invisible once the filter cartridge is installed. While this may result in differently-keyed filter cartridges having substantially similarly-shaped outer housings, a manufacturer may include indicia on the outer surface of the filter cartridge to indicate the different media or other filter differences. Also, a user may look at the key system structure as long as the filter cartridge is uninstalled. In any event, when the user attempts to install a cartridge, only properly-keyed cartridges can be installed into the holder/valve-head/manifold.

As an alternative to the tubular connector type system, another example of a key system structure is on structures that are involved in providing physical connection, rather than fluid connection. Such a key system structure may be on a shoulder of a filter cartridge that fits up into a valve-head holder. These areas are surfaces that do not normally liquid-seal to each other, but must clear each other if the end of the filter cartridge is to fit up inside the interior cavity of the valve-head. The top circumferencial shoulder of the filter cartridge and the inner surface of a valve-head, typically have areas that come in very close contact, but that are not directly involved in forming a liquid seal between the cartridge and the valve-head. These non-liquid-sealing areas may be keyed so that only a cartridge with a certain keyed surface shape may extend far enough up into the valve-head to be installed and locked into place. For example, tabs or other protrusions may be provided on the top surface of a filter spaced outward from an inlet-outlet neck, but external to the liquid-receiving passages. These filter cartridge protrusions may mate or "nest" in identically-located recesses on the inside surface of the valve-head that receives the cartridge, wherein the valve-head recesses are also external to the cartridge/valve-head liquid-receiving passages.

The keyed structure on the filter shoulder and the inner surface of the valve-head holder may be said to be located around the outer circumference of a shoulder of the top end of the filter cartridge and the cooperating or corresponding inner circumference of the valve-head cavity. Preferably the protruding "key" structure comprises a plurality of protrusions located within an arc of about 90 degrees or less around the circumference on which it lies, or more preferably within about 70 degrees or less. The cooperating recess structure is preferably located in the cavity surface, facing the filter cartridge shoulder, and, likewise, the same number of recesses are located within the same amount of circumference, preferably about 90 or less, and, more preferably, about 70 degrees or less. In this type of embodiment, the protruding and recessed structures do not form a liquid seal(s) between the filter cartridge and the valve-head, because other structure typically nearer the central axis of the filter cartridge and head serve that purpose. While this preferred key system locates the protrusions on the filter cartridge shoulder and the recesses on the head, the opposite is envisioned, wherein the protrusions may be inside the filter head and the recesses may be on the filter cartridge.

While the preferred keyed system includes keying of the holder and the filter cartridge, it may also include keying of an adaptor that is keyed to properly fit and cooperate with the keyed structure of the holder, and that has an unkeyed connected to a conventional, unkeyed filter cartridge.

Preferred Universal Key Option

For the tubular connector type keyed system, and for many of the various possible keyed systems for filter cartridges and filter holders, a universal key is desirable as an option for some circumstances. This universal key preferably takes the form of a filter cartridge that is adapted to fit any and all of the various differently-keyed holders that a manufacturer supplies to a single client/customer, or, alternatively, a filter cartridge that is adapted to fit any and all of the various differently-keyed holders that a manufacturer supplies to all of its clients/customers. As discussed above in the Summary, this allows an economical answer to the issue of providing differently-keyed main process filtration or treatment cartridges to a customer or to several customers while providing a single cleaning or other infrequent-use cartridge to a customer for all the customer's special applications, or to all customers for all their special applications. In other words, while there are good reasons to provide differently-keyed cartridges to different customers or to a single customer for his various uses, it may be important to have a single cartridge that is usable in all the customers' filtration/treatment systems, or at least in a plurality of differently-keyed holders.

Figure 14:
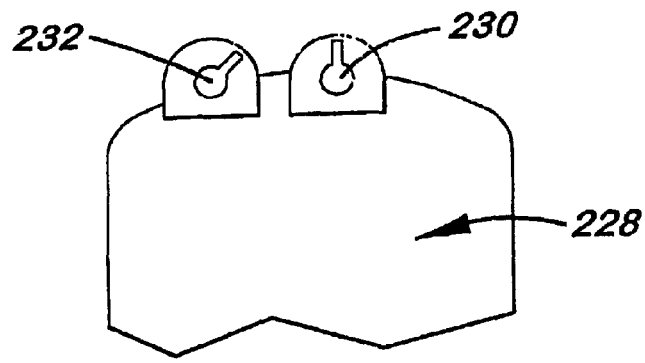
FIG. 14 is a partial side view of one embodiment of a filter cartridge, which is adapted to cooperate with the filter holder of FIGS. 6–13.
Figure 17:
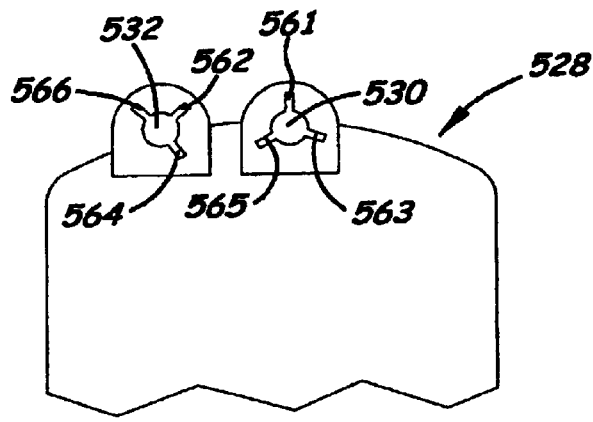
FIG. 17 illustrates a partial side view of an embodiment of a universal cartridge that is adapted to fit into all the filter holders that receive the differently-keyed cartridges shown in FIGS. 14–16.

A universal key system preferably comprises a filter cartridge that is adapted to fit a plurality or all of the differently-keyed holders that a manufacturer makes or that are supplied to a client/user. For example, in FIG. 17 is shown schematically a top end 528 of (or may be formed as an adapter for) a filter cartridge that is adapted to fit onto all three of the holders for which the three cartridges 228, 228', 228" in FIGS. 14–16 are made. That is, the FIG. 17 cartridge 528 has ports 530 and 532 that have multiple slots 561, 562, 563, 564, 565, 566 that extend radially from the center of the ports and that are positioned so that cartridge 528 will slide onto and properly liquid-seal with the three holders. This way, cartridge 528 is "universally-keyed" with a total of six slots to fit a plurality of holders, which holders each have only one slot per port.

Figure 18A:
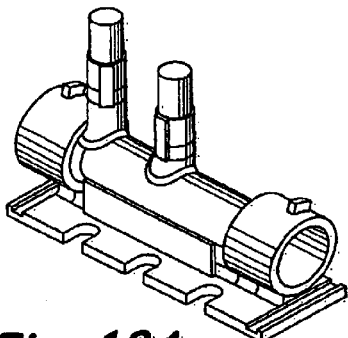
FIG. 18a illustrates a perspective view of an embodiment of holder according to the invention with tabs on inlet and outlet tubular connectors at 11 o'clock and 12 o-clock, respectively.
Figure 18B:
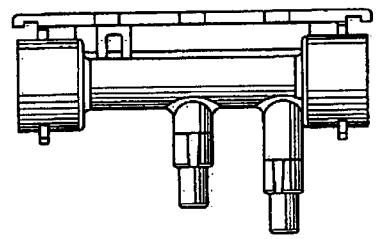
Figure 18C:
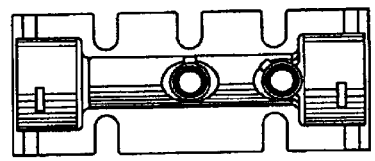
FIG. 18c is front side view of the holder in FIGS. 18a and 18b.
Figure 19A:
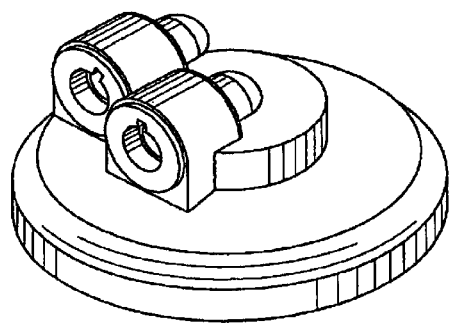
FIG. 19a is a perspective view of the top of a filter cartridge keyed for use with the holder of FIGS. 18a–c.
Figure 19B:
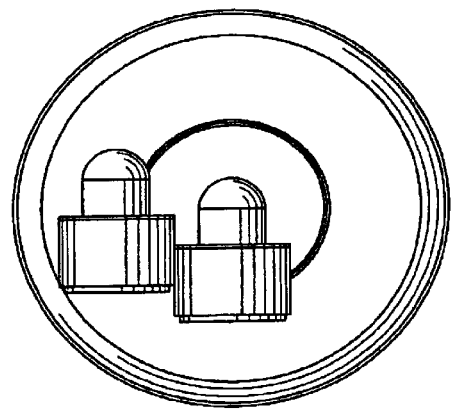
Figure 19C:
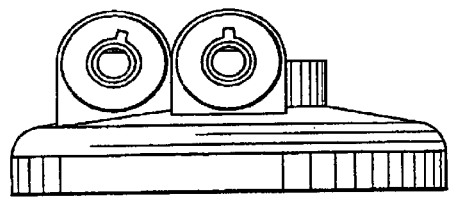
FIG. 19c is a front side view of the embodiment of FIG. 19a and b.
Figure 20A:
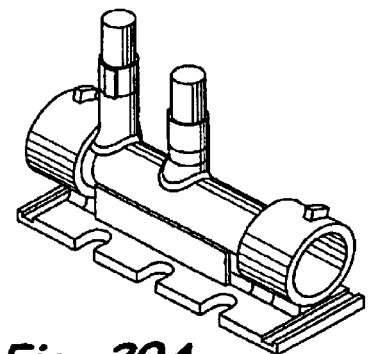
FIG. 20a illustrates a perspective view of another embodiment of holder according to the invention, with tabs on inlet and outlet tubular connectors at 11 o'clock and 3 o-clock, respectively.
Figure 20B:
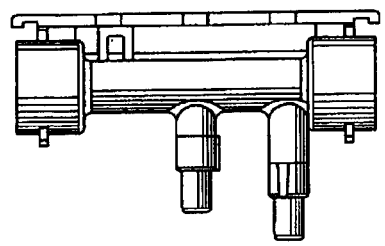
Figure 20C:
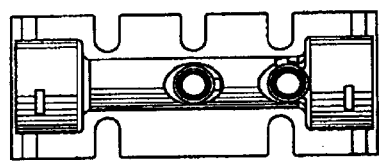
FIG. 20c is front side view of the holder in FIGS. 20a and 20b.
Figure 21A:
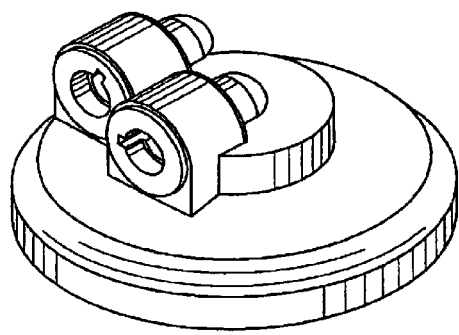
FIG. 21a is a perspective view of the top of a filter cartridge keyed for use with the holder of FIGS. 20a–c.
Figure 21B:
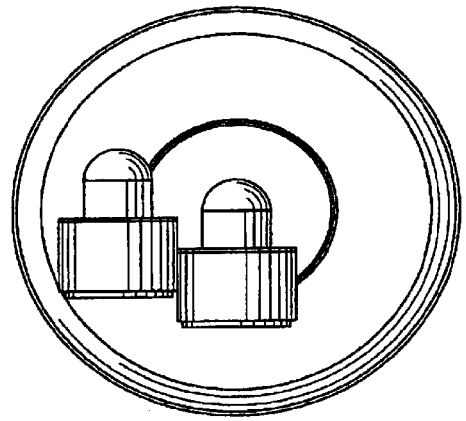
Figure 21C:
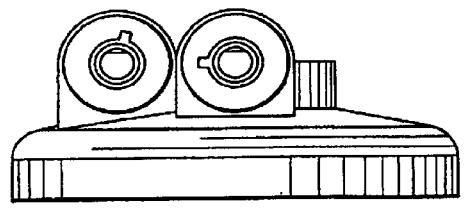
FIG. 21c is a front side view of the embodiment of FIG. 20a and b.

As further examples of the preferred tubular connector style system, FIGS. 18a–c illustrate views of a preferred male connector bracket, with one tab each on the inlet and outlet tubes. In FIGS. 19a–c, there are shown various views of a cartridge that is keyed to cooperate with the holder of FIGS. 18a–c. Likewise, FIGS. 20a–c and FIGS. 21a–c show views of an alternatively-keyed holder and cooperating cartridge, respectively. While these tubular connector systems include keyed systems in which each female or male connector only has a single slot or tab, alternative versions may have multiple tabs and slots on each female and male connector.

Figure 22:
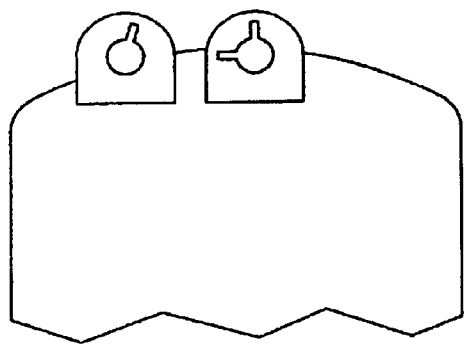
FIG. 22 is a side view of a top end of a universal cartridge keyed for use with both of the holders of FIGS. 18a–c and 20a–c.

FIG. 22 illustrates a universally-keyed cartridge top end (or adaptor) that is keyed to fit the holders of both FIGS. 18a–c and 20a–c. Note that the cartridge top end of FIG. 22 has two slots on one of the female connectors and one slot on the other of the female connectors, because the two holders of FIGS. 18 and 20 both have one tab position in common on one of the male connectors.

Figure 23:
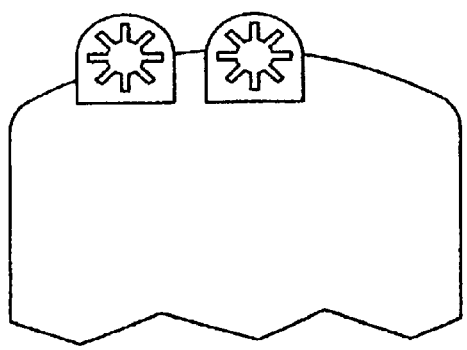
FIG. 23 is a side view of a top end of a universal cartridge keyed for use with a plurality of holders with keys are various positions 45 degrees apart, starting at "straight up at 12 o'clock" and spaced every 45 degrees from that position.

FIG. 23 illustrates a universally-keyed cartridge top end (or adaptor) that is keyed to fit with any and all holders that have tabs on male connectors that are positioned straight up (at "12 o'clock") and at various positions 45 degrees from that. For example, each of the two cartridge top end female connectors has eight slots radially extending out at straight up (0 degrees), 45 degrees, 90 degrees, 135 degrees, 180 degrees, 225 degrees, 270 degrees, and 315 degrees. This way, there are many combinations of one or more tabs on each of the male connectors that may be provided to a customer or customers, and the single cartridge in FIG. 23 will fit onto any of these 45 degrees version male holders. This way, the manufacturer may supply the same universally-keyed cleaning cartridge for many different customers that have requested differently-keyed cartridges for their main filtration/treatment processes.

After reading this description, one may understand that a universal key cartridge may be supplied for various keyed systems. For example, a universal key cartridge may be made for a keyed system wherein a filter cartridge shoulder that does not liquid seal to a valve head may include the appropriate universal-keying to fit into several valve heads with different key structures. Or, a tubular connector type system may include otherwise-shaped tabs and slots, for example, such as rounded bump-shaped tabs and slots.

By "holder" is meant any of a variety of devices that receive and seal to a replaceable filter or filter cartridge. This can include a valve head (including valving to shut off piping when the cartridge is removed), a filter bracket that supports the cartridge and provides fluid flow conduits into and out of the cartridge, and other devices that contact and are in fluid communication with the cartridge.

By "filter" or "filter cartridge" is meant any container of filtration or treatment media that is connected to a holder for fluid communication with the holder to filter and/or treat the fluid brought into it via the holder. The keyed system invention may be applied to whatever structure of a filtering unit is inserted into the head or other holder, which might be a unitary filter or a filter cartridge encased partially in an outer housing below the level where the filter cartridge engages in the head.

Although this invention has been described above with reference to particular means, materials and embodiments, it is to be understood that the invention is broad scope of the following claims.

I claim:

1. A filter system comprising a bracket module and a filter, the filter having a top end and a bottom end, and the bracket module comprising:

a top bracket holding the filter top end and a bottom bracket holding the filter bottom end, and at least one of said top bracket or said bottom bracket comprising at least one fluid connection with the filter adapted to convey fluid to or from the filter;

wherein the top bracket comprises a pivotal lid adapted to pivot down onto the filter top end to retain the filter top end in the top bracket and adapted to pivot up away from the filter top end to allow removal of the filter top end from the top bracket;

wherein the bottom bracket comprises a pivotal connection so that the filter, when received in the bottom bracket, is pivotal away from the top bracket.

2. A filter system as in claim 1, further comprising a key system wherein said top bracket comprises a tubular member with an outer cylindrical surface and a protrusion extending outward from said outer cylindrical surface, and wherein said filter top end comprises a port adapted to receive said tubular member to form said at least one fluid connection, and wherein said port has an interior cylindrical surface having a recess adapted to receive said protrusion of said tubular member, so that only a filter having said recess can be installed in fluid connection with said top bracket.

3. A filter system as in claim 2, wherein said key system comprises said tubular member having a plurality of said protrusions at different radial positions around the tubular member and said port having a plurality of said recesses at corresponding radial positions so that only a filter having said recesses at said corresponding radial positions can be installed in fluid connection with said top bracket.

4. A filter system as in claim 2, wherein said filter port is universally keyed to fluidly connect to said top bracket by means of having a plurality of recesses at different radial positions so that said filter can fluidly connect to said top bracket when said protrusion is located at any of said radial positions.

5. A filter system as in claim 1, further comprising a key system wherein said at least one fluid connection is between said top bracket and said filter, and wherein said at least one fluid connection comprises an exterior cylindrical surface having a key protrusion and an interior cylindrical surface having a key recess adapted to receive said key protrusion.

6. A filter system as in claim 1, further comprising a key system wherein said bottom bracket comprises a tubular member with an outer cylindrical surface and a protrusion extending outward from said outer cylindrical surface, and wherein said filter bottom end comprises a port adapted to receive said tubular member to form said at least one fluid connection, and wherein said port has an interior cylindrical surface having a recess adapted to receive said protrusion of said tubular member, so that only a filter having said recess can be installed in fluid connection with said bottom bracket.

7. A filter system as in claim 6, wherein said key system comprises said tubular member having a plurality of said protrusions at different radial positions around the tubular member and said port having a plurality of said recesses at corresponding radial positions so that only a filter having said recesses at said corresponding radial positions can be installed in fluid connection with said bottom bracket.

8. A filter system as in claim 6, wherein said filter port is universally keyed to fluidly connect to said bottom bracket by means of having a plurality of recesses at different radial positions so that said filter can fluidly connect to said bottom bracket when said protrusion is located at any of said radial positions.

9. A filter system as in claim 1, further comprising a key system wherein said at least one fluid connection is between said bottom bracket and said filter, and wherein said at least one fluid connection comprises an exterior cylindrical surface having a key protrusion and an interior cylindrical surface having a key recess adapted to receive said key protrusion.

10. The filter system as in claim 1, further comprising a plurality of sets of top brackets and bottom brackets and a plurality of said filters, wherein one of said plurality of filters is received in each of said top brackets and bottom brackets, and the filter system further comprising fluid conduit extending between said top brackets.

11. The filter system as in claim 1, wherein said top brackets comprises an attachment plate for being attached to a vertical surface.

12. The filter system as in claim 1, wherein said bottom brackets comprises an attachment plate for being attached to a vertical surface.

13. A filter system comprising a bracket module and a filter, the filter having a top end and a bottom end, and the bracket module comprising:
a top bracket holding the filter top end and a bottom bracket holding the filter bottom end, and at least one of said top bracket or said bottom bracket comprising at least one fluid connection with the filter adapted to convey fluid to or from the filter;
wherein the top bracket comprises a pivotal lid adapted to pivot down onto the filter top end to retain the filter top end in the top bracket and adapted to pivot up away from the filter top end to allow removal of the filter top end from the top bracket;
wherein the filter top end comprises an inlet port and an outlet port and said top bracket comprises an inlet fluid tubular connector adapted to seal with and convey fluid to said inlet port and said top bracket comprises an outlet fluid tubular connector adapted to seal with and convey fluid to said outlet port of the filter;
wherein said filter has a longitudingl axis between the top end and the bottom end, and said inlet fluid tubular connector and said outlet fluid tubular connector are perpendicular to said longitudingl axis, and said inlet port and outlet port are perpendicular to the longitudinal axis and slide onto said tubular connectors.

14. A filter system as in claim 13, wherein said bottom bracket does not comprise a fluid connection with the filter.

15. A filter system as in claim 13, further comprising a key system wherein at least one of said inlet and outlet fluid tubular connectors has an outer cylindrical surface and a protrusion extending outward from said outer cylindrical surface, and
wherein at least one of said inlet and outlet ports has an interior cylindrical surface having a recess adapted to receive said protrusion, so that only a filter having said recess can be installed in fluid connection with said top bracket.

16. The filter system as in claim 15, wherein said key system comprises said at least one of said inlet and outlet tubular connectors having a plurality of said protrusions at different radial positions and the at least one of said inlet and outlet ports having a plurality of said recesses at corresponding radial positions so that only a filter having said recesses at said corresponding radial positions can be installed in fluid connection with said top bracket.

17. A filter system as in claim 15, wherein said filter is universally keyed to fluidly connect to said top bracket by means of having a plurality of recesses at different radial positions so that said filter can fluidly connect to said top bracket when said protrusion is located at any of said radial positions.

18. The filter system as in claim 13, further comprising a plurality of sets of top brackets and bottom brackets and a plurality of said filters, wherein one of said filters is received in each of said top brackets and bottom brackets, and the filter system further comprising fluid conduit extending between said top brackets.

19. A filter system comprising a bracket module and a filter, the filter having a top end and a bottom end, and the bracket modules comprising:
a top bracket holding the filter top end and a bottom bracket holding the filter bottom end, and said top bracket comprising two fluid connections with the filter adapted to convey fluid to and from the filter;
wherein said bottom bracket comprises a pivotal connection so that the filter, when received in the bottom bracket, is pivotal away from the top bracket, and wherein said bottom bracket receives and supports said filter bottom end by means of the bottom bracket having a central upending post that is not a fluid conduit and said filter bottom end having an indentation that is not a fluid port slidably and removably received on said upending post, wherein said bottom bracket is not in fluid communication with the filter.

20. A filter system comprising a bracket module and a filter, the filter having a top end and a bottom end, and the bracket module comprising:
a top bracket holding the filter top end and a bottom bracket holding the filter bottom end, and at least one of said top bracket or said bottom bracket comprising at least one fluid connection with the filter adapted to convey fluid to or from the filter;
wherein the top bracket comprises a pivotal lid adapted to pivot down onto the filter top end to retain the filter top end in the top bracket and adapted to pivot up away from the filter top end to allow removal of the filter top end from the top bracket;
wherein the top bracket further comprises a biasing means for urging the pivotal lid to pivot downward toward the filter top end.

21. A filter system comprising a bracket module and a filter, the filter
having a top end and a bottom end, and the bracket module comprising:

a top bracket holding the filter top end and a bottom bracket holding the filter bottom end, and at least one of said top bracket or said bottom bracket comprising at least one fluid connection with the filter adapted to convey fluid to or from the filter;

wherein the top bracket comprises a pivotal lid adapted to pivot down onto the filter top end to retain the filter top end in the top bracket and adapted to pivot up away from the filter top end to allow removal of the filter top end from the top bracket;

wherein said bottom bracket further comprises a biasing means for urging the bottom bracket to pivot the filter to a vertical position.

22. A filter system comprising a bracket module and interchangeable first and second filters adapted to connect to said bracket module, the bracket module comprising:

a top bracket adapted to releaseably engage a top end of each of said first and second filters and to disengage from the top end of each filter to allow removal of each of the filter from the top bracket; and the filter system further comprising a key system wherein said top bracket comprises a tubular member with an outer cylindrical surface and a protrusion extending outward from said outer cylindrical surface at one of a plurality of preselected radial locations, wherein said first filter has a top end port adapted to receive said tubular member to form a fluid connection, said port having an interior cylindrical surface having a recess at a position corresponding to said one of the plurality of preselected radial locations of said protrusion so that the recess is adapted to receive said protrusion of said tubular member, and wherein said second filter has a top end port adapted to receive said tubular member to form a fluid connection, said second filter port having an interior cylindrical surface having recesses at all of said plurality of preselected radial locations, so that said first filter is specifically keyed to connect to the one protrusion of the top bracket and said second filter is universally keyed to connect to said top bracket.

23. A filter system comprising a bracket module and interchangeable first and second filters adapted to connect to said bracket module, the bracket module comprising:

a top bracket adapted to releaseably engage a top end of each of said first and second filters and to move away from the top end of each filter to allow removal of each of the filter from the top bracket; and the filter system further comprising a key system wherein said top bracket comprises a tubular member with an outer cylindrical surface and protrusions extending outward from said outer cylindrical surface at multiple, but not all, of a plurality of preselected radial locations, wherein said first filter has a top end port adapted to receive said tubular member to form a fluid connection, said port having an interior cylindrical surface having recesses at positions corresponding to said multiple of the plurality of preselected radial locations so that the recesses are adapted to receive said protrusions of said tubular member, and wherein said second filter has a top end port adapted to receive said tubular member to form a fluid connection, said port of the second filter having an interior cylindrical surface having recesses at all of said plurality of preselected radial locations, so that said first filter is specifically keyed to connect to the multiple protrusions of the top bracket and said second filter is universally keyed to connect to said top bracket.

* * * * *